(12) United States Patent
Tischer et al.

(10) Patent No.: US 6,223,617 B1
(45) Date of Patent: May 1, 2001

(54) ACTUATOR FOR GEARSHIFT MECHANISMS OF MOTOR VEHICLES

(75) Inventors: Dieter Tischer, Wendlingen; Roland Meyer, Roth, both of (DE)

(73) Assignee: Hydraulik-Ring GmbH (DE)

( * ) Notice: Subject to any disclaimer, the term of this patent is extended or adjusted under 35 U.S.C. 154(b) by 0 days.

(21) Appl. No.: 09/151,884

(22) Filed: Sep. 11, 1998

(30) Foreign Application Priority Data

Sep. 12, 1997 (DE) .............................................. 197 40 090

(51) Int. Cl.⁷ .................................................... F16H 61/26
(52) U.S. Cl. ............................................ 74/473.11; 74/335
(58) Field of Search .............................. 74/335, 473.11, 74/473.12, 471 XY; 92/61, 68, 76

(56) References Cited

U.S. PATENT DOCUMENTS

| | | | |
|---|---|---|---|
| 4,896,553 | * | 1/1990 | Sato et al. ............................... 74/335 |
| 5,623,852 | * | 4/1997 | Tisher et al ............................. 74/335 |
| 5,722,297 | * | 3/1998 | Tischer et al. .......................... 74/335 |

FOREIGN PATENT DOCUMENTS 0 791 770 A2 * 8/1997 (EP) .

* cited by examiner

Primary Examiner—David A. Bucci
Assistant Examiner—William C. Joyce
(74) Attorney, Agent, or Firm—Robert W. Becker & Associates (57) ABSTRACT

A control device for a transmission of a motor vehicle has a housing and actuators with which a rotary or linear movement of a gear shifting shaft of the transmission is performed in order to select gates and gears of the transmission. The actuators are arranged adjacent and parallel to one another in the housing.

11 Claims, 11 Drawing Sheets

ACTUATOR FOR GEARSHIFT MECHANISMS OF MOTOR VEHICLES

BACKGROUND OF THE INVENTION

The invention relates to a control device for transmissions of motor vehicles.

In such transmissions two actuators are positioned aligned with one another. Between them a control lever is positioned which is pivoted by the actuators in order to select in the transmission the desired gate or the desired gear. Since the actuators are aligned with one another, the control device has a respectively great length. Therefore, it cannot be used in all situations.

It is therefore an object of the present invention to embody a control device of the aforementioned kind such that it is of a compact design.

SUMMARY OF THE INVENTION

In the inventive control device the actuators with which the rotatory and linear movement of the gear shifting shaft of the transmission is performed are positioned parallel and adjacent to one another within the control device housing. This results in a space-saving, especially also manufacturing-technological favorable component which can be mounted even where only minimal mounting space is available.

Further features of the invention result from the further claims, the description, and the drawings.

BRIEF DESCRIPTION OF THE DRAWINGS

The invention will be explained with the aid of an embodiment represented in the drawings. It is shown in:

FIG. 6 and

FIG. 8 through

DESCRIPTION OF THE PREFERRED EMBODIMENTS

The control device to be disclosed in the following serves to move the gear shifting shaft for transmissions of motor vehicles in order to select different gates of the transmission or to select different gears of the transmission.

Figure 1:
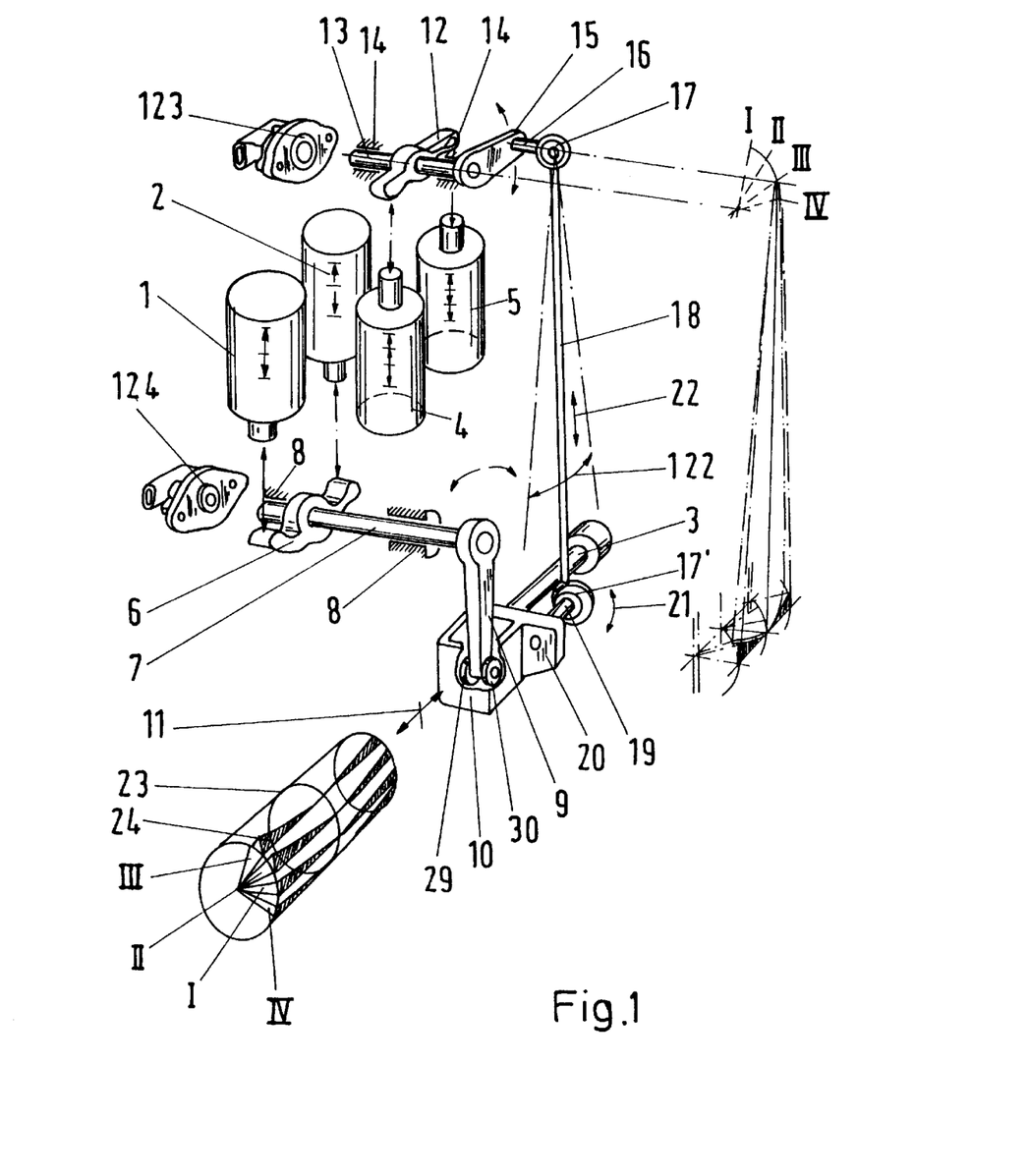
FIG. 1 a perspective and schematic representation of the inventive control device.

The control device has, as shown in FIG. 1, two actuators 1, 2 positioned axially parallel to one another with which the gear shifting shaft 3 of the transmission of the vehicle is to be moved, in a manner to be disclosed, in the axial direction in order to select gears. The control device has two further actuators 4 and 5 which are positioned axis-parallel to one another and to the actuators 1, 2 and with which, in a manner to be disclosed in the following, the gear shifting shaft 3 is rotated about its axis in order to select the respective gate of the transmission. The actuators 1, 2 cooperate with a rocker 6 which is fixedly connected to a shaft 7 that extends perpendicularly to the axial direction of the actuators 1, 2 and to the gear shifting shaft 3. The shaft 7 is rotatably supported in bearings 8 and supports at its free end a lever 9 which projects perpendicular from it and engages a bearing member 10 that is fixedly connected to the gear shifting shaft 3. The actuators 1, 2 can pivot the rocker 6 about its axis so that the shaft 7 is rotated accordingly. This results in that the lever 9 is pivoted correspondingly. The bearing member 10 is moved by the lever 9 in the direction of double arrow 11 of FIG. 1. Since the bearing member 10 is fixedly connected to the gear shifting shaft 3, it is axially moved by the corresponding amount and in this manner the respective gear is selected.

The two actuators 4, 5 cooperate with a further rocker 12 which is fixedly connected to the shaft 13. They extend perpendicularly to the axis of the actuators 4, 5 as well as parallel to the shaft 7. The shaft 13 is rotatably supported in the bearings 14 and at its free end is provided with a perpendicularly projecting single arm lever 15 which is fixedly connected to the shaft 13. An axle piece 16 projects perpendicularly from the free end of the lever 15 and is positioned parallel to the axis 13 and provided at the side of the lever 15 facing away from the rocker 12. A connecting rod 18 is pivotably connected to the free end of the axle piece 16 by a ball joint 17, whereby the other end of the connecting rod 18 is connected pivotably by a further ball joint 17' to the free end of the axle piece 19. It is positioned parallel and adjacent to the gear shifting shaft 3 and projects perpendiculary from a flange 20 transversely extending from the bearing member 10.

Upon actuation of the actuators 4, 5 the rocker 12 is rotated about its axis. Since it is fixedly connected to the shaft 13, the shaft 13 is correspondingly rotated. The lever 15 is thus accordingly pivoted. The connecting rod 18 is thus minimally pivoted about the connecting point of the ball joint 17. Since the connecting rod 18 is connected by the ball joint 17 to the axle piece 19 of the bearing member 10, this pivot movement results in a rotation about the axis of the switching shaft 3. In this manner, the gate of the transmission for a subsequent selection of a gear is selected. Upon pivoting of the lever 15, the connecting rod 18 is pivoted not only in the direction of double arrow 21 but also moved in the direction of double arrow 22 in its longitudinal direction.

When the gear shifting shaft 3 is moved in the disclosed manner in the direction of arrow 11 for selecting a gear, the connecting rod 18 is pivoted (arrow 122) slightly about the pivot point of the ball joint 17. Due to the pivot movement 122 of the connecting rod 18 a slight rotatory movement of the gear shifting shaft 3 results which is adjusted across the length of the connecting rod 18 such that its movement takes place within the selected gate. It is thus ensured that upon selection of the gear the selected gate of the transmission will not be disengaged.

In FIG. 1, the movement diagram of the gear shifting shaft 3 in the form of a cylinder is shown. The central circle 23 of the movement diagram shows the central and neutral position of the transmission. From this central position 23 the switching shaft 3 can be moved for selecting a gear in the respective direction along the mantle of the imaginary movement cylinder. Because of the aforementioned slight pivoting action of the connecting rod 18 upon selecting a gear, on the cylinder mantle a somewhat curved movement curve 24 and not a straight curve results which is slightly shorter than the mantle length of the imaginary movement cylinder. The curvature of this movement curve 24 is however so minimal that upon selecting the gear the selected gate of the transmission is not disengaged.

In order to select another gate, the gear shifting shaft 3 must be rotated about its axis. In the shown embodiment a total of four gates I through IV are to be selected. From the movement diagram it can be taken that the gear shifting shaft 3 must be rotated by greater angles in order to be moved from one into another gate. This rotary angle is in any case greater than the rotational movement required for selecting the gears which is illustrated by the curved movement curve in the movement diagram.

Another movement diagram is represented also in FIG. 1 for the shaft 13. The four positions I through IV of the lever 15, respectively, of the pivot joint 17 are represented which correspond to the respective gates I through IV.

Figure 2:
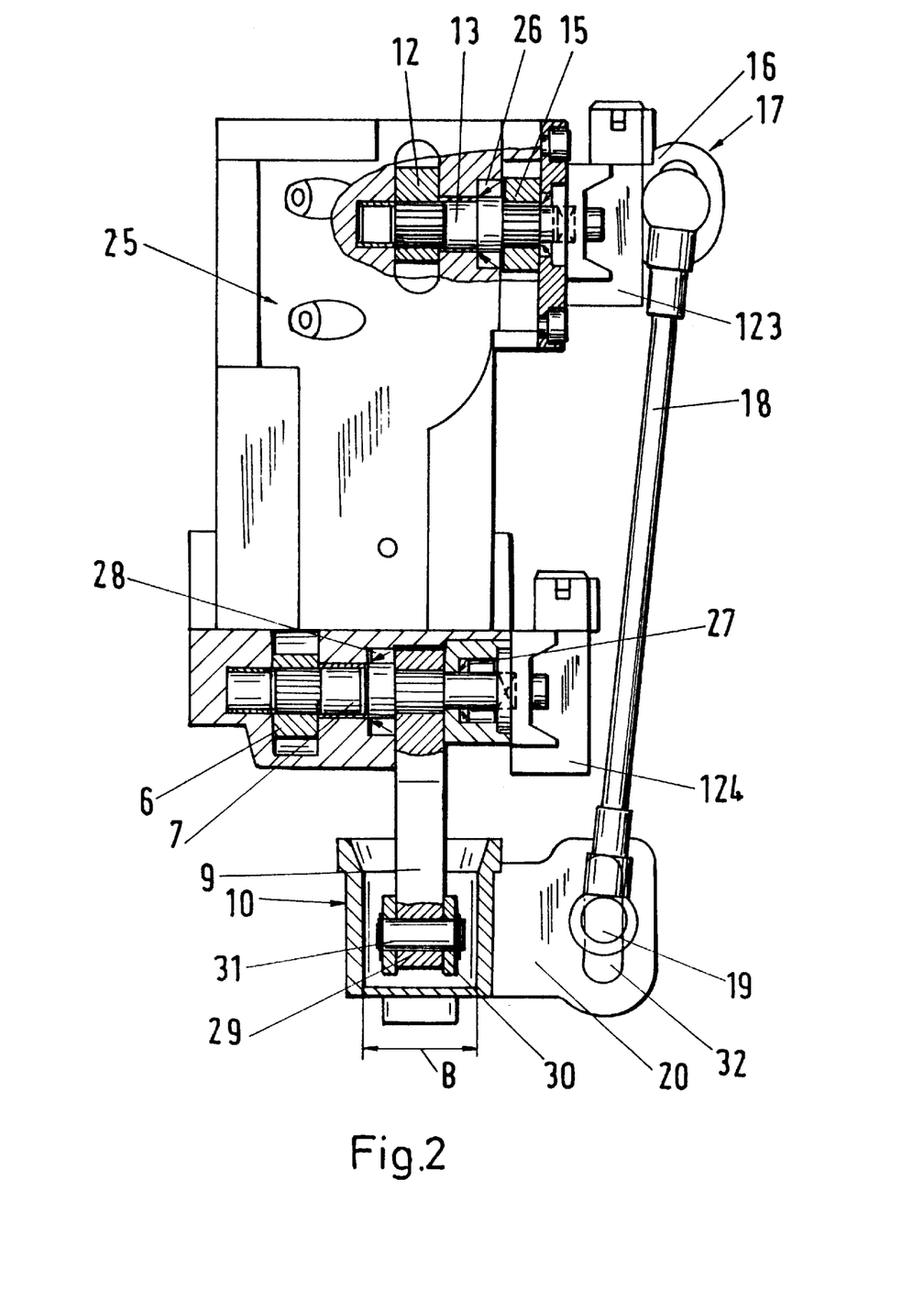
FIG. 2 in an enlarged representation and partly in section the connection between the shaft of the control device and the gear shifting shaft of a transmission.

FIG. 2 shows a housing 25 in which the actuators 1, 2; 4, 5 are positioned. The upper end of the housing 25 as shown in FIG. 2 houses the shaft 13 on which the rocker 12 is positioned within the housing 25. The single arm lever 15 is arranged within the housing 25 on the shaft 13 and is connected by the connecting piece 16 and the ball joint 17 to the connecting rod 18 in a pivotable manner. The shaft 13 is sealed in the housing 25 by at least one seal 26.

At the lower end of the housing 25 the shaft 7 is rotatably supported (FIG. 2). The single-arm lever 9 is positioned within the housing 25 on the shaft 7 and projects downwardly from the housing 25. Within the housing 25 the rocker 6 is seated on the shaft 7. The shaft 7 in the housing 25 is sealed by two seals 27, 28.

On both sides of the free end of the lever 9 running disks 29, 30 are positioned which are connected to one another and to the lever 9 by a bolt 31 penetrating the lever 9.

The bearing member 10, as shown in FIG. 1, has a rectangular cross-section and is cup-shaped. The lever 9 is positioned with its running disks 29, 30 which are resting with a large surface area at the two opposed outer sides of the lever 9, within the bearing member 10. The running disks 29, 30 are preferably rotatable about their axes and project downwardly past the lever 9. The diameter of the running disks 29, 30, as shown in FIG. 1, is greater than the width of the lever 9. Accordingly, upon pivoting of the lever 9 only the running surfaces 29, 30 come into contact with the inner walls of the bearing member 10 in a direction transverse to the movement direction 11 (FIG. 1). Since the running disk 29, 30 rotate freely, the bearing member 10 and thus the gear shifting shaft 3 can be displaced efficiently in the movement direction 11 for selecting a gear.

The flange 20 which extends perpendicular to the bearing member 10 has a slotted hole 32 through which the connecting piece 19 projects. The slotted hole 32 extends perpendicularly to the displacement direction 11 of the bearing member 10, respectively, the switching shaft 3. The slotted hole 32 makes it easy to compensate tolerances during mounting of the connecting rod 18. In the mounted position, the connecting piece 19 is fixedly connected to the flange 20.

The inner width B of the bearing member 10 is greater than the length of the bolt 31, respectively, the spacing of the running disks 29, 30. This ensures that the lever 9 with the running disks 29, 30 has a sufficient lateral spacing from the inner walls of the bearing member 10. Accordingly, the bearing member 10 can be pivoted by the connecting rod 18 for selecting the gate of the transmission without any impediment by the lever 9.

Figure 3:
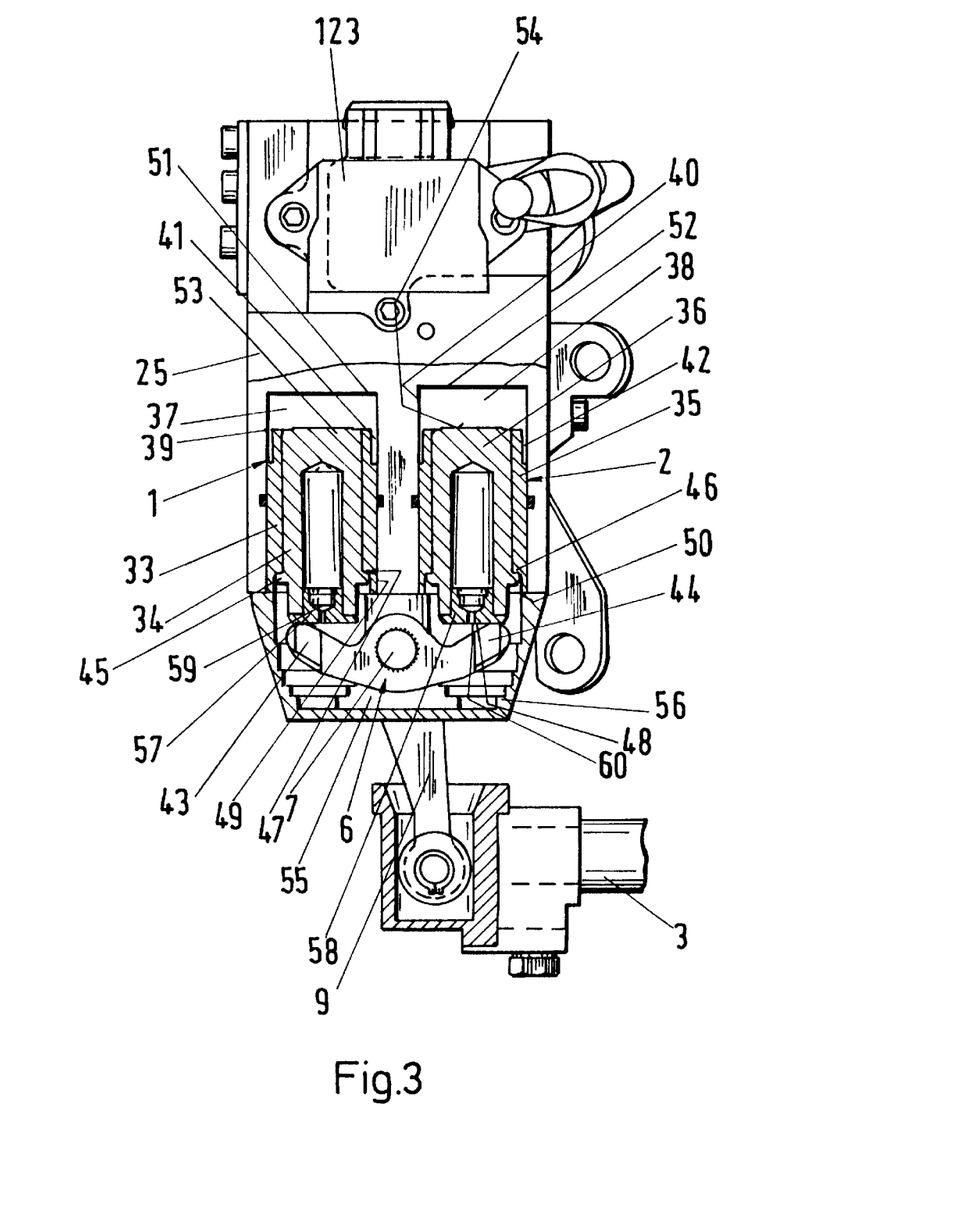
FIG. 3 in an enlarged representation and partly in section two actuators of the inventive control device for moving the gear shifting shaft of the transmission.

The two actuators 1, 2 are positioned within the housing 25 with minimal spacing parallel and adjacent to one another (FIG. 3). They have respectively two pistons 33, 34 and 35, 36. The pistons 33, 35 are embodied as hollow pistons which are displaceably guided within the cylinder chamber 37, 38. The pistons 33, 35 are positioned in a sealed manner at the bore walls 39, 40. In the vicinity of the upper end the two pistons 33, 35 are reduced in their outer diameter so that a respective annular chamber 41, 42 is formed which extends over less than half the length of the piston 33, 35.

At the inner wall of the piston 33, 35 the inner pistons 34, 36 are positioned without employing sealing elements. The inner pistons project past the hollow pistons 33, 35 in the downward direction and rest at the free ends 34, 44 of the rocker 6. The pistons 34, 36 are provided in the vicinity of their lower ends with a radially outwardly projecting annular flange 45, 46 which serves as an abutment for the piston 34, 36. With these annular flanges the pistons 34, 36 rest at the inner annular shoulder area 47, 48 of the hollow pistons 33, 35 as shown for the neutral position in FIG. 3. The inner pistons 34, 36 in the neutral position rest at the free ends 43, 44 of the rocker 6. The hollow pistons 33, 35 are positioned with their lower end faces at the abutments 49, 50 of a lid 56. In this neutral positions the pistons 33 through 36 are spaced from the bottom 51, 52 of the cylinder chambers 37, 38. The inner pistons 34, 36 have at their end faces facing the bottoms 51, 52 a projection 53, 54 having a diameter that is smaller than the diameter of the inner pistons 34, 36.

The rocker 6 is positioned in a rocker chamber 55 which is closed off by a detachable lid 56. The rocker chamber 55 can be filled during operation with hydraulic medium. This has the advantage that the pistons 33 through 36 must not be reliably sealed and that it is sufficient to provide two inexpensive sealing elements. The rocker chamber 55 is connected to the piston. The inner pistons 34, 36 project in the neutral position (shown in FIG. 1) in which they rest with their annular flanges 45, 46 at the annular shoulder surfaces 47, 48 of the hollow pistons 33, 35 downwardly into the rocker chamber 55. A closure piece 57, 58 is introduced into the lower end of the inner pistons 34, 36. It is penetrated by at least one bore 59, 60. The medium which is contained in the rocker chamber 55 can thus be introduced into the inner pistons 34, 36. The hollow bore of the inner piston 34, 36 serves as a weight saving measure.

Figure 4:
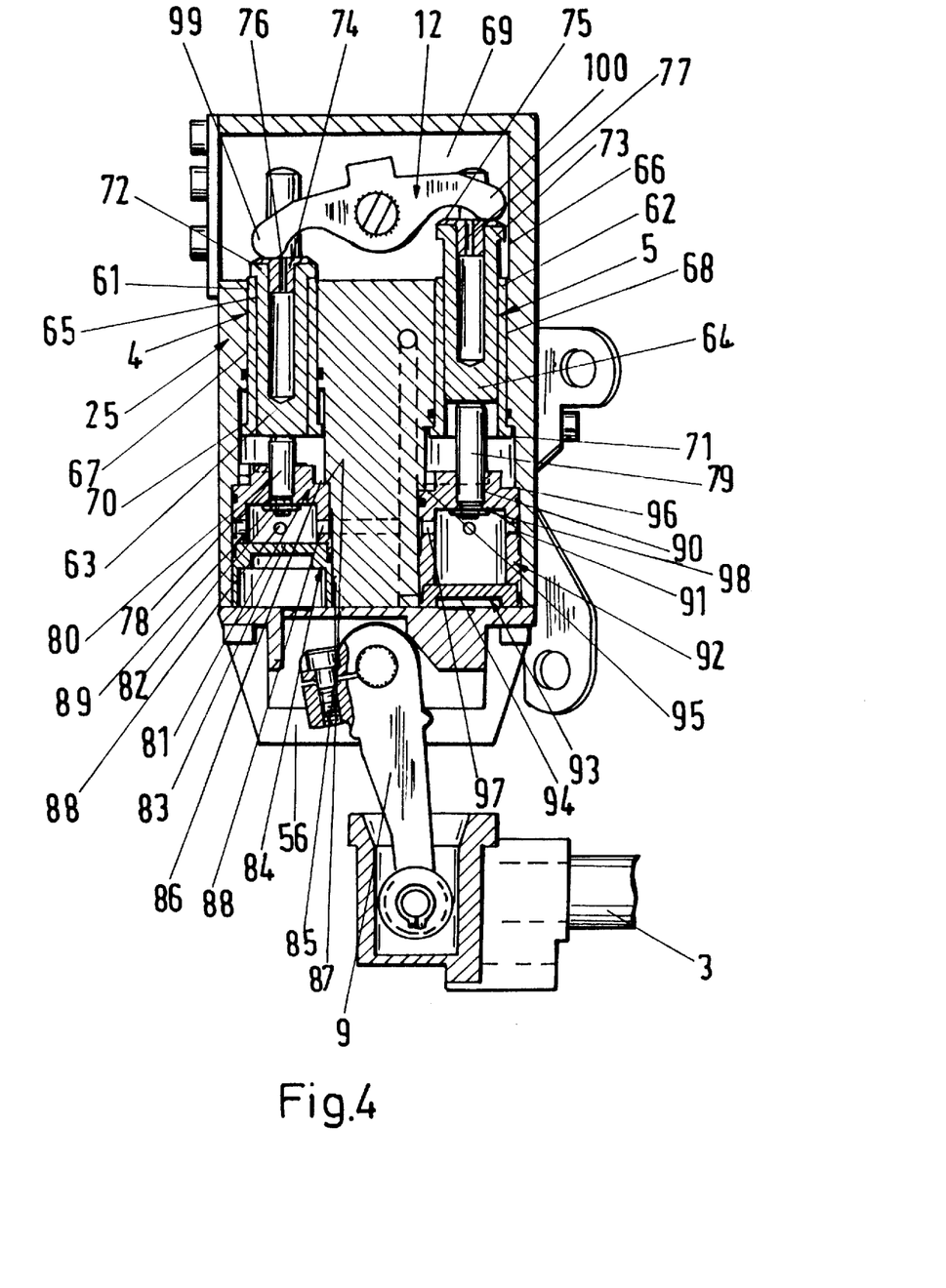
FIG. 4 in an enlarged representation and partly in section two actuators of the inventive control device for rotating the gear shifting shaft of the transmission about its axis.

As shown in FIG. 4, the two actuators 4, 5 in the housing are positioned adjacent one another with minimal spacing. They have a respective outer hollow piston 61, 62 in which respectively an inner piston 63, 64 is movably guided. The hollow pistons 61, 62 are positioned in a sealed manner at the inner wall 65, 66 of bores 67, 68. In the area above the pistons 61 through 64 the rocker 12 is arranged within the rocker chamber 69.

The hollow pistons 61, 62 have at their lower end an outwardly oriented annular flange 70, 71 while the inner pistons 63, 64 have at their upper end facing the rocker 12 a circumferential annular flange 72, 73. The inner pistons 63, 64 are embodied, like the inner pistons 34, 36 of the actuators 1, 2, in a hollow fashion. The hollow chambers are closed by closure pieces 74, 75 which are penetrated by at least one bore 76, 77.

The inner pistons 63, 64 are positioned with their lower end faces on bolt shaped pistons 78 and 79. The piston 78 is shorter than the piston 79. The shorter piston 78 projects through a piston bore 80 into a cup-shaped bearing member 81 having a bottom 82 facing the pistons 61, 63 and penetrated by the piston bore 80.

The bearing member 81 is positioned with its end face on the bottom 83 of a cup-shaped bearing member 84 which with its end face rests at the lid 56. Both bearing members 81, 84 are positioned axially fixedly in the receiving chamber 85 of the housing 25. As shown in FIG. 4, the bearing members 81, 84 rest sealingly at the wall of the receiving chamber 85. The upper bearing member 81 is positioned with its shoulder surface 86 at a ring shoulder 87 of the inner wall of the receiving chamber 85. Openings 88 open into the bearing member 81 which are uniformly distributed over the circumference of the wall of the bearing member. The hydraulic medium can be introduced therethrough for loading the bolt-shaped piston 78. Its end facing the bearing member 81 has an abutment 89 with which the piston, in the position represented in FIG. 5, rests under pressure load at the bottom 82 of the bearing member 81 when loaded by the pressure medium present within the bearing member 81.

The bolt shaped piston 79 projects also through a piston bore 90 in the bottom 91 of a bearing member 92 which is, in principle, of the same design as the bearing member 81 but is longer than it. On the other hand, the lower bearing member 93 on which the bearing member 92 with its end face is resting, is shorter than the bearing member 84. Both bearing members 92, 93 are axially non-movably received in the receiving chamber 94 of the housing. The bearing member 92, 93 rest sealingly at the inner wall of the receiving chamber 94. The upper bearing member 92 rests with a shoulder surface 95 at a circumferential annular shoulder 96 at the inner wall of the receiving chamber 94.

A plurality of openings 97 open into the inner chamber of the bearing member 92 which are preferably uniformly distributed about the circumference of the bearing member 92 and which serve to introduce hydraulic medium. This hydraulic medium is used for loading the piston 79 having an end positioned within the bearing member 92 and provided with an abutment 98. The piston rests, in the position of FIG. 4, with the abutment 98 at the bottom 91 of the bearing member 92.

The rocker chamber 69 can be filled, like the lower rocker chamber 55 (FIG. 3), with hydraulic medium during operation. The pistons 63 to 66 are connected to the rocker chamber 69 and thus must not be reliably sealed. Within the rocker chamber 69 the inner piston 63, 64 rests at the free ends 99, 100 of the rocker 12.

Figure 5:
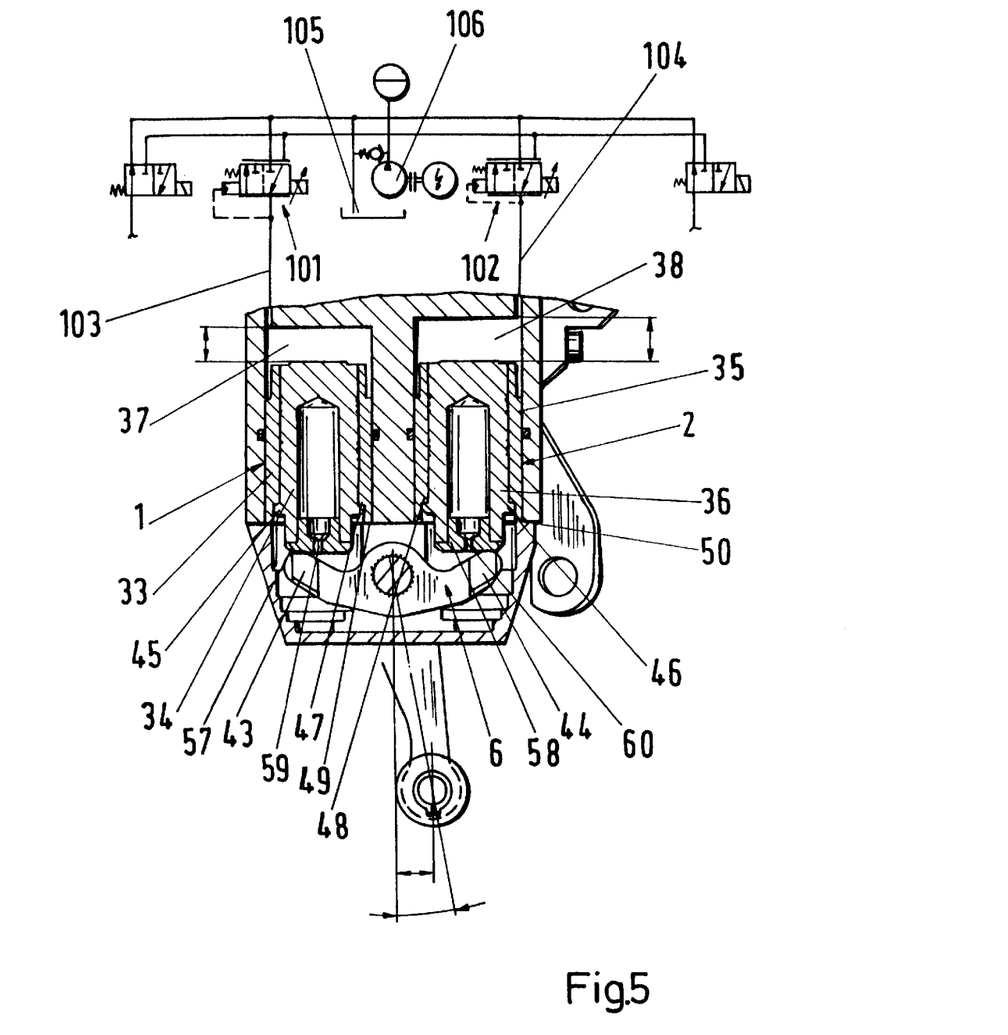
FIG. 5 the actuators of the inventive control device for moving the gear shifting shaft into a neutral position.

FIG. 5 shows the pistons 33 through 36 of the actuators 1, 2 in a position in which the switching shaft 3 of the transmission is in the neutral position. The inner pistons 34, 36 are positioned with their flanges 45, 46 at the annular shoulder surfaces 47, 48 of the hollow pistons 33, 35 which, in turn, rest with their end faces facing the rocker 6 at the abutments 49, 50 at the lid. The cylinder chambers 37, 38 are connected by directional control valves 101, 102. As shown in FIG. 5, they are switched such that the hydraulic medium can flow via lines 103, 104 under pressure into the cylinder chambers 37, 38 and thus can load the pistons 33, 34 as well as 35, 36 with pressure so that the neutral position represented in FIG. 5 is reached. Since the piston surfaces of the two actuators 1, 2 delimiting the pressure chambers 37, 38 are of the same size, the rocker 6 is thus loaded at both ends 43, 44 with the same force so that the rocker 6 is maintained in a central position. The free ends 43, 44 of the rocker 6 are embodied such that in this central position the bores 59, 60 of the closure pieces 57, 58 will not close the inner pistons 34, 36. The hydraulic medium is supplied from a tank 105 by a pump 106.

For selecting the even numbered gears 2 and 4 in the corresponding gates of the transmission, the directional control valve 101 is switched such (FIG. 6) that the pressure chamber 37 is relieved in a direction toward the tank 105. The directional control valve 102 remains in its switching position in which the hydraulic medium in the pressure chamber 38 is pressurized. Since the pressure chamber 37 of the actuator 1 is relieved in direction toward the tank 105, the inner piston 36 of the actuator 2 is displaced in the downward direction from the position shown in FIG. 6 by the hydraulic medium pressure. Since the hollow piston 35 rests at the abutment 50 at the lid, the hollow piston 35 is not displaced by the pressure load. The inner piston 36 which moves in the downward direction out of the hollow piston 35 pivots the rocker 6 in the representation according to FIG. 6 in the clockwise direction. The inner piston 34 of the actuator 1 is then upwardly moved by the end 43 of the rocker. It entrains by its annular flange 45 the outer hollow piston 33. The hydraulic medium contained in the pressure chamber 37 is thus displaced via line 103 into the tank 105. The end position is reached when the two pistons 33, 34 will come to rest at the bottom 55 of the pressure chamber 37.

Figure 6:
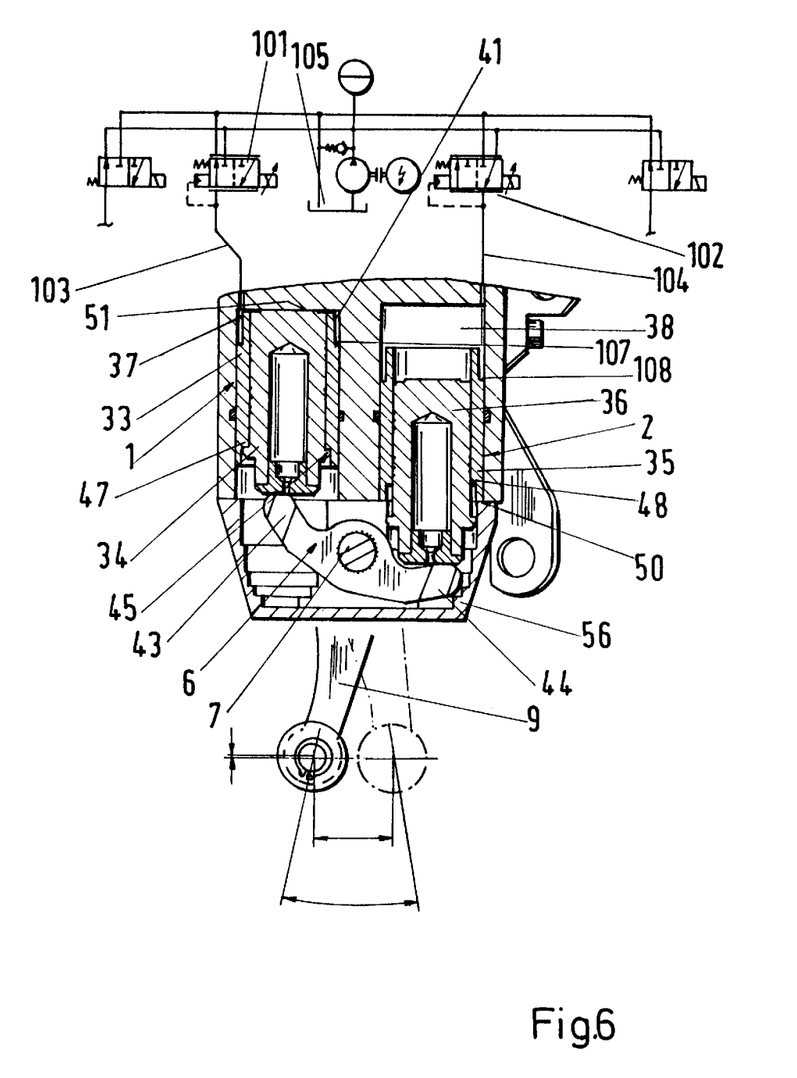

Since the rocker 6 is fixedly connected to the shaft 7, the lever 9 which is fixedly connected to the shaft is moved from the neutral position shown in dash-dotted line in FIG. 6 in the clockwise direction into the position shown in solid lines. This pivot movement of the lever 9 is transformed into a movement of the bearing member 10 (FIG. 1) in the direction of arrow 11 so that the gear shifting shaft 3 is accordingly moved.

For selecting the odd gears 1, 3, 5 and the reverse gear R in the corresponding gates of the transmission, the two directional control valves 101, 102 are switched (FIG. 7) so that the pistons 33, 34 of the actuator 1 are moved downwardly. The pistons 35, 36 of the actuator 2 are moved in the upward direction by the rocker 6 so that the hydraulic medium contained in the pressure chamber 38 is displaced via line 104 into the tank. The pistons 35, 36 of the actuator 2 are moved upwardly to such an extent that they come to rest at the bottom 52 of the pressure chamber 38. The two pistons 33, 34 of the actuator 1 are then displaced by the pressurized hydraulic medium in the downward direction. This displacement results in the end face of the hollow piston 33 coming to rest at the abutment 49 at the lid. Further pressure loading results in the inner piston 34 being downwardly moved relative to the outer hollow piston 33 until the pistons 35, 36 of the actuators 2 will be positioned in the abutment position according to FIG. 7. The rocker 6 in this case is pivoted counter clockwise so that the lever 9 is moved from the neutral position shown in dash-dotted lines in FIG. 7 into the position required for selecting the gear R/1/3/5. The pivot movement of the lever 9 is transformed into the linear movement of the bearing member 10 in the direction of arrow 11 (FIG. 1). The gear shifting shaft 3 connected to the bearing member 10 is axially displaced in the corresponding direction.

Since the rocker chamber 55 is filled with hydraulic medium and the closure pieces 57, 58 of the inner pistons 34, 36 have the penetration bores 59, 60, the hydraulic medium can flow upon movement of the piston via these bores into the inner pistons 34, 36.

Figure 7:
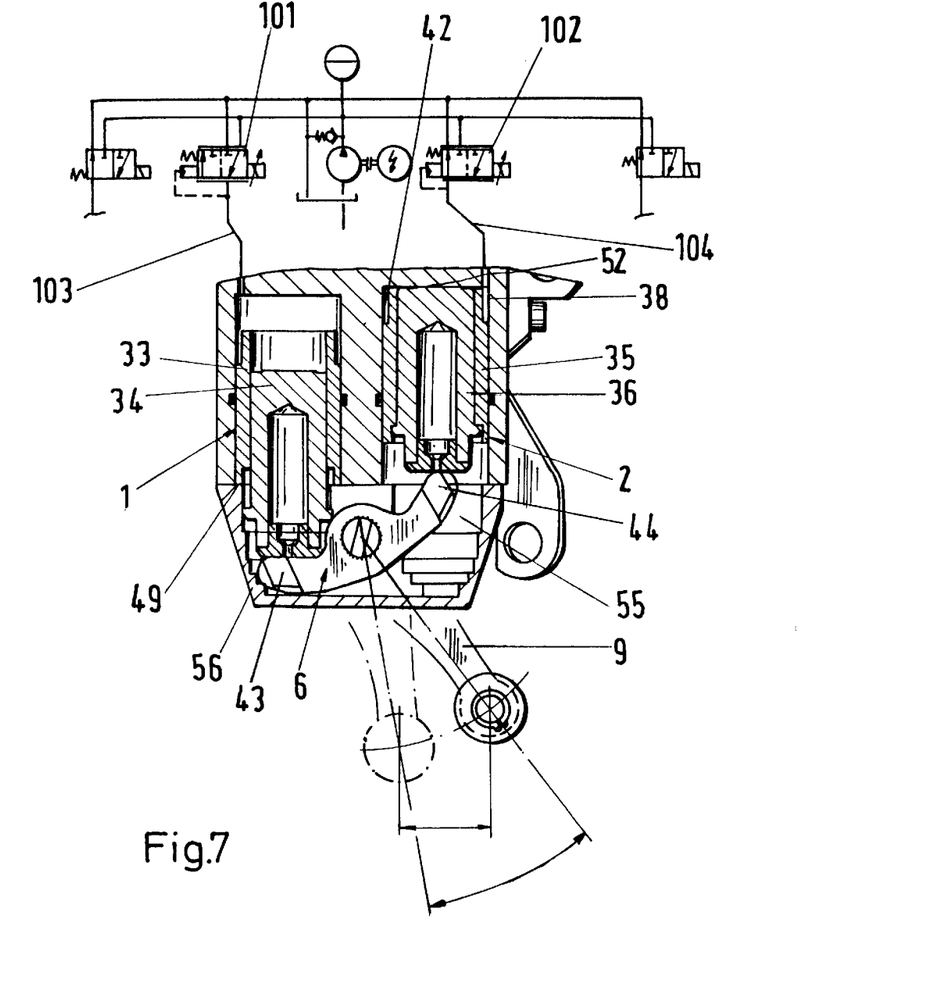
FIG. 7 the actuators of the inventive control device for moving the gear shifting shaft into different switching positions in which different gears are selected.

In order to reach the central position of FIG. 5 from the position of FIG. 6 or 7, the directional control valves 101, 102 must be switched into the position according to FIG. 5. The hydraulic medium supplied via the lines 103, 104 loads the end faces of the respective pistons 33, 34 or 35, 36 which are positioned in the upper abutment position at a spacing to the bottoms 51, 52 of the pressure chambers 37, 38. The annular chambers 41, 52 are limited by shoulder surfaces 107, 108 at the outer wall of the hollow pistons 33, 35. These annular shoulder surfaces are loaded selectively also by the hydraulic medium. The hollow piston 33 or 35 entrains via the annular shoulder surface 47 or 48 the inner piston 34 or 36. The respective hollow piston 35, 36 with its lower end face is supported in the previously disclosed manner at the lid 56 when the pistons 35, 36 (FIG. 6) or 33, 34 (FIG. 7) are in the lower position. Accordingly, only the end face of the respective inner pistons 34, 36 is effectively loaded. Since this surface is smaller than the loaded surface of the pistons 33, 34 (FIG. 6) or 35, 36 (FIG. 7) in the upper position different forces are acting on the ends 43, 44 of the rocker 6. The rocker 6 is thus pivoted until the upper hollow piston 33, 35 will come to rest at the respective abutment 49, 50 at the lid. As soon as these abutment positions have been reached, only the inner pistons 34, 36 will rest at the rocker 6 having pressure-loaded end faces of the same size. This is a equilibrium position. It is maintained by the inner pistons 34, 36 with their annular flanges 45, 46 resting at the annular shoulders 47, 48 of the hollow pistons 33, 35.

With the aid of FIGS. 8 through 11 it will be disclosed in the following in detail how the actuators 4, 5 can select the gates of the transmission of the motor vehicle in order to subsequently select the respective gears with the actuators 1 and 2, respectively, to disengage the gears.

Figure 8:
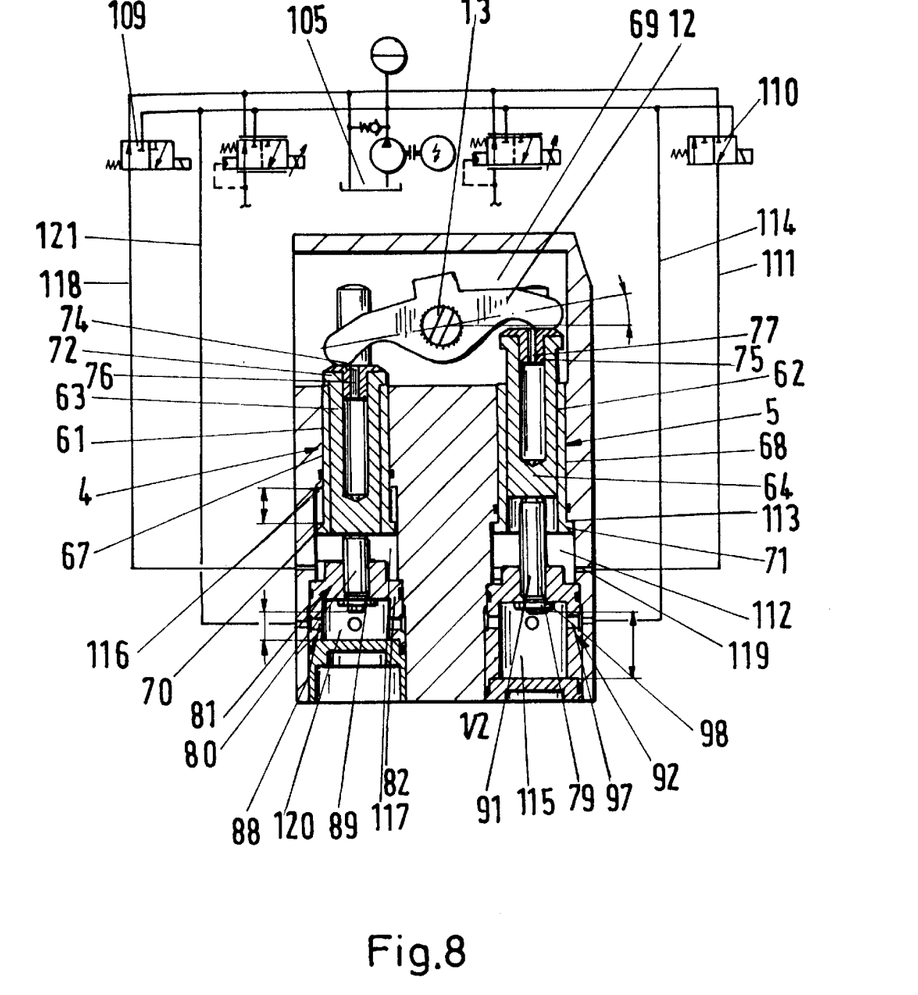

FIG. 8 shows the actuator 4, 5 in a position in which in the gate 1 for the gears 1 and 2 has been selected. Two directional control valves 109 and 110 are correlated with the actuators 4, 5. The directional control valve 110 is switched such that the hydraulic medium from the tank 105 can flow via line 111 and a bore 119 into a pressure chamber 112 that is positioned between the bearing member 92 and the two pistons 62, 64 of the actuator 5. Since the hydraulic medium in the pressure chamber 112 is pressurized, the two pistons 62, 64 are loaded in the direction of the rocker 12. The hollow piston 62 rests with its annular flange 21 at an annular shoulder 113 that is provided in the inner wall of the bore 68. The inner piston 64 is loaded under the pressure of the hydraulic medium in the direction toward the rocker 12.

At the same time, via line 114 hydraulic medium is supplied via the opening 97 into the bearing member 92 having an interior chamber providing a pressure chamber 115. The hydraulic medium thus placed under pressure loads the piston 75 in the upward direction so that it will rest with its annular abutment 98 at the bottom 91 of the bearing member 92.

The piston 64 loads the rocker 12 in the representation according to FIG. 8 counter clockwise. Accordingly, the piston 63 of the actuator 4 is loaded in the downward direction. The piston 63 rests with its annular flange 72 at the end face of the hollow piston 61 facing the rocker 12 and loads it in the downward direction. The annular flange 70 of the hollow piston 16 has a spacing from an annular shoulder 116 which is provided in the inner wall of the bore 67. Between the two pistons 61, 63 and the bearing member 81 the pressure chamber 117 is provided into which a line 118 opens that can be relieved via the directional control valve 109 to the tank 105.

The bearing member 81 comprises a pressure chamber 120 into which via a line 121 and via the opening 88 hydraulic medium is introduced. In the position according to FIG. 8 the hydraulic medium within the pressure chamber 120 is pressurized so that the abutment 89 of the piston 80 is loaded with pressure. The piston 80 is moved in the upward direction to such an extent until it rests with its abutment 89 within the pressure chamber 120 at the bottom 82 of the bearing member 81. The piston 80 projects into the pressure chamber 117 and supports the inner piston 63 against the force of the rocker 12. The pressure in the pressure chamber 120 thus produces a force which is greater than the force acting on the piston 63 by the rocker 12 in the opposite direction.

In this position of the piston 61 through 64 of the two actuators 4, 5 the gate I for the first and second gears of the transmission are selected. The hydraulic medium contained within the rocker chamber 69 communicates via bores 76, 77 of the connecting pieces 74, 75 with the inner chamber of the pistons 63, 64.

Since the rocker 12 is fixedly connected to the shaft 13, the bearing member 10 and thus the gear shifting shaft 3 are rotated about the axis in the rotational direction 21 (FIG. 1) by the lever 15 and the connecting rod 18 (FIG. 1).

In order to select the gate 11 and the third or fourth gear (FIG. 9) the directional control valve 109 is switched relative to the position according to FIG. 8. The hydraulic medium in the pressure chamber 117 is thus loaded with hydraulic medium via the lines 118. Accordingly, the two pistons 61, 63 are loaded with pressure medium and are moved in the upward direction until the hollow piston 61 comes to rest with its annular flange 70 at the annular shoulder 116 at the housing. The inner piston 63 thus is lifted off the piston 80 which remains pressurized by the pressure within the pressure chamber 120 and is thus maintained in contact at the bottom 82 of the bearing member 81 with its abutment 89.

The sum of the surfaces of the pistons 61, 63 loaded within the pressure chamber 117 is greater than the loaded effective surface of the piston 64 in the pressure chamber 112. Since the hollow pistons 62 with its annular flange 71 is supported at the annular shoulder at the housing, the surface of this hollow piston 62 loaded within the pressure chamber 112 is not effective. Accordingly, the rocker 12 is pivoted in the clockwise direction by the piston 63 in the representation according to FIG. 9 whereby the shaft 13 is rotated about its axis in the clockwise direction. The gear shifting shaft 3 is thus rotated by the lever 15 and the connecting rod 18 and by the bearing member 10 accordingly. The end 100 of the rocker forces the piston 64 downwardly. The hollow piston 62 remains in its position, as compared to the position according to FIG. 8.

Upon movement of the piston 64, the piston 79 is moved downwardly because its pressure-loaded surface in the pressure chamber 115 is smaller than the surface of the piston 63 loaded with the same pressure. The abutment 98 of the piston 64 lifts off the bottom 91 of the bearing member 92. As soon as the piston 64 with its annular flange 73 abuts at the end face of the pressureloaded piston 62 facing the rocker 12, the desired gate 11 is selected. The two pistons 79, 80 have a diameter which is smaller than the diameter of the end face of the inner piston 63, 64. Due to the disclosed diameter ratios and the pressure ratios within the pressure chambers 112, 115, it is achieved that the inner piston 64 is maintained by the bolt-shaped piston 79 in the central position represented in FIG. 9.

Figure 9:
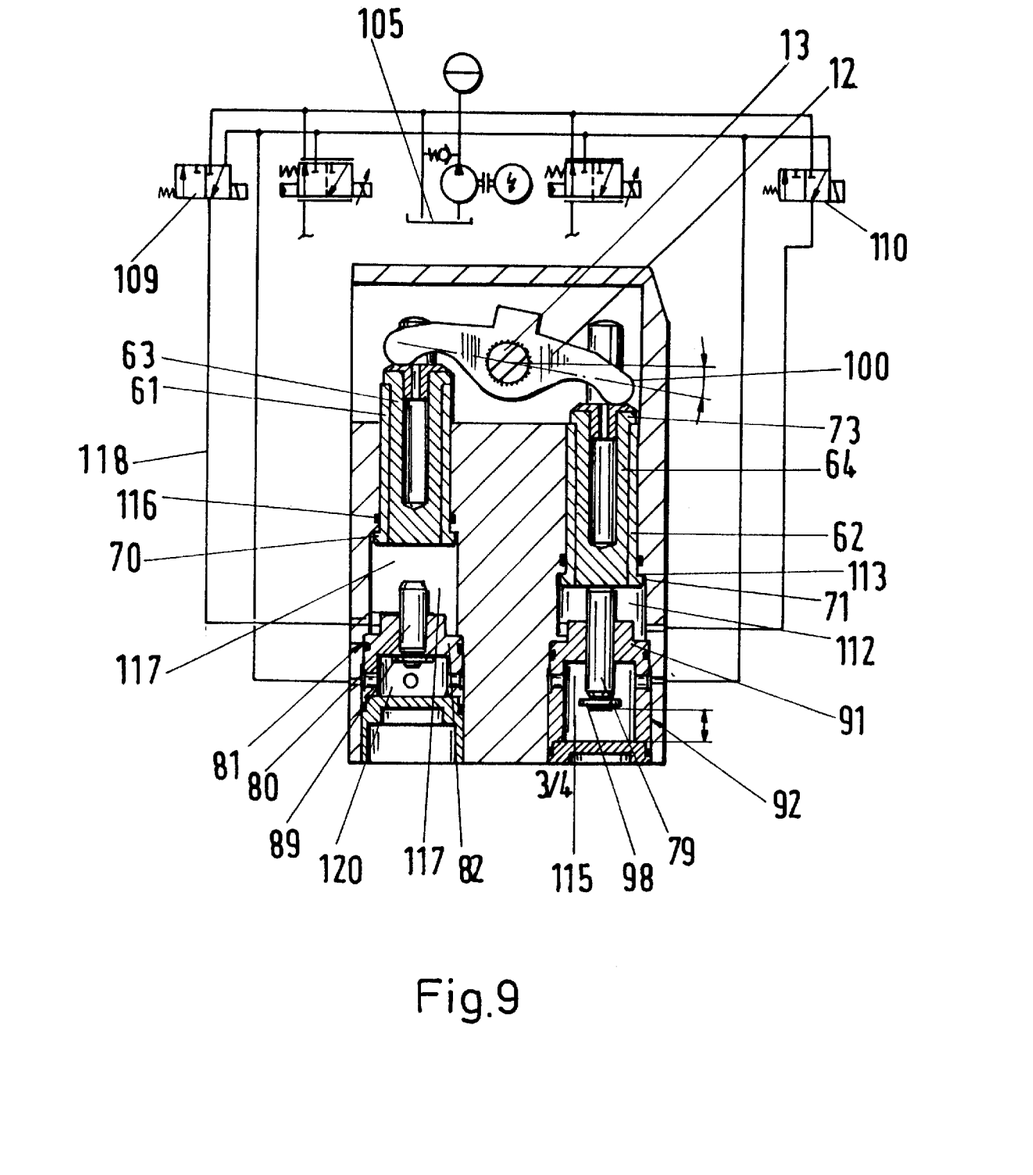
Figure 10:
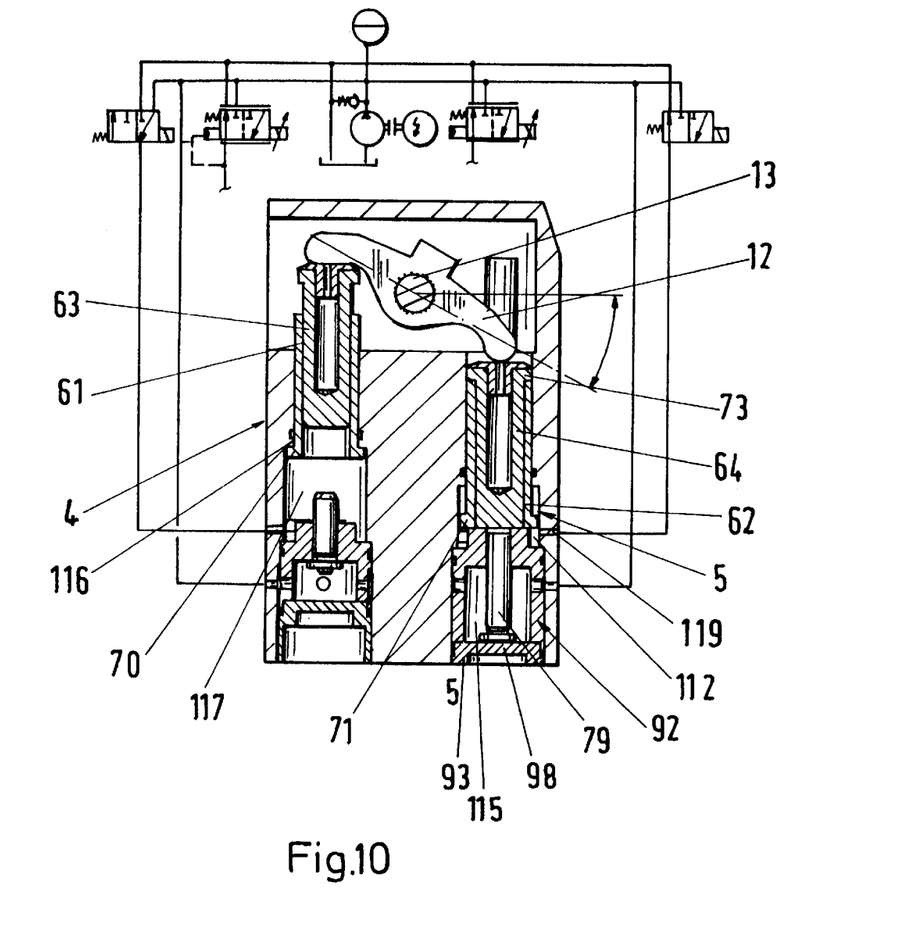

The shaft 13 can be rotated in the clockwise direction from the position represented in FIG. 9 into the position according to FIG. 2 in order to select the gate III for the fifth gear of the transmission. The pressure chamber 112 is in this case relieved in the direction toward the tank 105. Accordingly, the counter force acting on the rocker 12 is only provided by the surface of the piston 79 within the pressure chamber 115. Since the pressure chamber 117 of the actuator 4 is still loaded with pressure, the inner piston 63 can thus move upwardly relatively to the hollow piston 61. Thus, the rocker 12 is pivoted further about its axis in the clockwise direction. The hollow piston 61 remains with its annular flange 70 in abutment at the annular shoulder 116 at the housing. This pivot movement causes the rocker 12 to push the inner piston 64 downwardly. Via its annular flange 73 it entrains the hollow piston 62 and moves it also downwardly. Simultaneously, the bolt-shaped piston 79 is moved into the bearing member 92 until it rests with its abutment 98 on the lower bearing member 93. In this lower position of the pistons 62, 64 of the actuator 5 the bore 119 opening into the pressure chamber 112 is not closed.

Due to the pivot movement of the rocker 12 the shaft 13 is rotated accordingly about its axis. The shaft 3 of the transmission is moved by the lever 15 and the connecting rod 18 (FIG. 1) above the bearing member 10 in the required amount about its axis.

Figure 11:
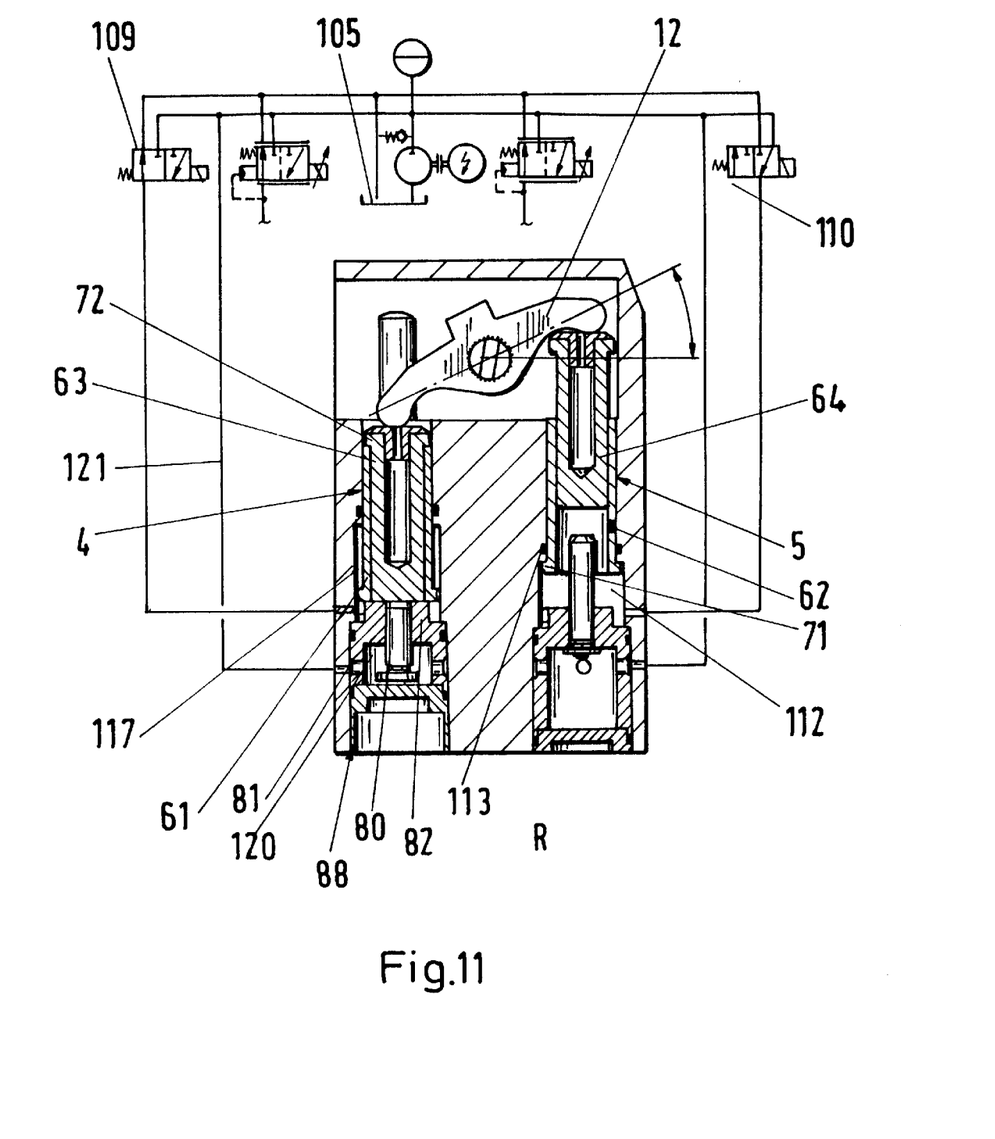
FIG. 11 a respective section of the actuators of the inventive control device for rotating the gear shifting shaft into different switching positions for selecting different gates.

FIG. 11 shows the position of the piston of the two actuators 4 and 5 when the gate IV for the reverse gear R is to be selected. Based on the position represented in FIG. 8, the pressure chamber 117 of the actuator 4 is relieved in the direction toward the tank 105. The pressure chamber 120 remains via the line 121 loaded with system pressure. Via the directional control valve 110 the pressure chamber 112 of the actuator 5 is loaded with pressure so that the inner piston 64 is moved upwardly. The hollow piston 62 rests with its annularflange 71 at the annular shoulder 113 of the housing and cannot be displaced any further. Via the pistons 64 the rocker 12 is rotated counter clockwise. It thus moves the inner piston 63 of the actuator 4 in the downward direction due to the pressure relief. The inner pistons 62 entrains the hollow piston 61 by the annular flange 72. The bolt-shaped piston 80, having a surface area loaded within the pressure chamber 120 that is smaller than the surface area of the piston 64 loaded within the pressure chamber 112 is thus moved into the bearing member 81. The rocker 12 is pivoted by the piston 64 to such an extent until the inner piston 63 will come to rest at the bottom 82 of the bearing member 81 or the piston 80 will come to rest at the bearing member 88.

With corresponding switching of the directional control valves 109, 110 the pistons 61 through 64 of the two actuators 4, 5 can be displaced in opposite directions. In order to easily transmit the respective rotational movements of the shafts 7 and 13 into the required rotary or linear movements of the switching shafts 3 of the transmission, the lever 9 which engages the bearing member 10 can have a spherical design at its free end, instead of the two running disks 29, 30. This also ensures a linear or rotary movement of the bearing member 10.

The actuators 1, 2, 4, 5 are positioned directly axis-parallel within the housing 25 adjacent to one another. Accordingly, this control device has a very compact design so that it can be used in vehicles in which only very small receiving spaces for the control device are available. The control device operates very reliably. In order to activate the different movements of the actuators 1, 2, 4, 5, switching buttons can be provided within the vehicle which must only be pressed in order to initiate the required movement of the individual pistons of the actuators. It is also possible to actuate the disclosed movements of the pistons of the actuators by a control lever which is then only to be tipped in the corresponding direction in order to select the desired gear. The disclosed rotary and linear displacement movement of the switching shaft 3 will occur within minimal periods of time so that the desired gears can be selected quickly. This allows also a very sporty driving of the motor vehicle.

The disclosed and represented axis-parallel arrangement of the actuators 1, 2, 4, 5 is an optimal solution with regard to manufacturing and assembly. When the constructive conditions require it, at least one of the actuators can also be arranged at an angle to its counter actuator. In this case, the two arms of the corresponding rocker are no longer aligned but staggered and in an angular position to one another. The directional control valves 101, 102 are preferably proportional valves with pressure return (pressure reducing valves) in order to modulate the pressure during selection of the gears and the synchronization process.

A rotary measuring system 123, 124 is respectively correlated with the shafts 7, 13 (FIG. 1 through FIG. 3). Preferably, the measuring systems 123, 124 are potentiometers but they can also be provided in a contact-free embodiment.

The specification incorporates by reference the entire disclosure of German priority document 197 40 090.6 of Sep. 12, 1997.

The present invention is, of course, in no way restricted to the specific disclosure of the specification and drawings, but also encompasses any modifications within the scope of the appended claims.

What is claimed is:

1. A control device for a transmission of a motor vehicle, said control device comprising:

a housing (25);

actuators (1, 2; 4, 5), with which a rotary and linear movement of a gear shifting shaft (3) of the transmission is performed in order to select gates and gears of the transmission; wherein said actuators (1, 2; 4, 5) are arranged in an array adjacent and parallel to one another in said housing (25);

a first shaft (13) and a first rocker (12) fixedly connected to said first shaft (13), wherein said first rocker (12) acts on first and second actuators (4, 5);

a first lever (15) fixedly connected to said first shaft (13);

a connecting piece (10) connected to the gear shifting shaft (3);

a linkage (18) pivotably connecting said first lever (15) to said connecting piece (10), wherein a third and fourth of said actuators (1, 2) for selecting the gear of the transmission are positioned at the same level adjacent to one another;

a second shaft (7) and a second rocker (6) fixedly connected to said second shaft (7), wherein said third and fourth actuators (1, 2) cooperate with said second rocker (6) for selecting a gear; and a second lever (9) fixedly connected to said second shaft (7), said second lever (9) cooperating with the connecting piece (10) of the gear shifting shaft (3).

2. A control device according to claim 1, wherein said connecting piece (10) is a hollow body engaged by said second lever (9) of said second shaft (7).

3. A control device according to claim 1, wherein said first and second levers (9, 15) of said first and second shafts (7, 13) are angularly positioned to one another.

4. A control device for a transmission of a motor vehicle, said control device comprising:

a housing (25);

actuators (1, 2; 4, 5), with which a rotary and linear movement of a gear shifting shaft (3) of the transmission is performed in order to select gates and gears of the transmission: wherein said actuators (1, 2; 4, 5) are arranged in an array adjacent and parallel to one another in said housing (25);

a first shaft (13) and a first rocker (12) fixedly connected to said first shaft (13), wherein said first rocker (12) acts on first and second actuators (4, 5);

a first lever (15) fixedly connected to said first shaft (13);

a connecting piece (10) connected to the gear shifting shaft (3);

a linkage (18) pivotably connecting said first lever (15) to said connecting piece (10), wherein a third and fourth of said actuators (1, 2) for selecting the gear of the transmission are positioned at the same level adjacent to one another; and a second shaft (7) and a second rocker (6) fixedly connected to said second shaft (7), wherein said third and fourth actuators (1, 2) cooperate with said second rocker (6) for selecting a gear, and wherein said first and second shafts (7, 13) of said first and second rockers (6, 12) extend parallel to one another.

5. A control device for a transmission of a motor vehicle, said control device comprising:

a housing (25);

actuators (1, 2; 4, 5), with which a rotary and linear movement of a gear shifting shaft (3) of the transmission is performed in order to select gates and gears of the transmission; wherein said actuators (1, 2; 4, 5) are arranged in an array adjacent and parallel to one another in said housing (25);

a first shaft (13) and a first rocker (12) fixedly connected to said first shaft (13), wherein said first rocker (12) acts on first and second actuators (4, 5);

a first lever (15) fixedly connected to said first shaft (13);

a connecting piece (10) connected to the gear shifting shaft (3);

a linkage (18) pivotably connecting said first lever (15) to said connecting piece (10), wherein a third and fourth of said actuators (1, 2) for selecting the gear of the transmission are positioned at the same level adjacent to one another; and a second shaft (7) and a second rocker (6) fixedly connected to said second shaft (7), wherein said third and fourth actuators (1, 2) cooperate with said second rocker (6) for selecting a gear, and wherein said actuators (1, 2; 4, 5) each comprise at least two oppositely movable pistons (33–36; 61–64; 79, 80).

6. A control device according to claim 5 wherein said pistons (33–36; 61–64) of each one of said actuator (1, 2; 4, 5) are nested within one another.

7. A control device according to claim 5, wherein said housing has a rocker chamber (55, 69) and wherein at least one of said first and second rockers (6, 12) is positioned within said rocker chamber (55, 69), wherein said rocker chamber (55, 69) is fillable with a hydraulic medium.

8. A control device according to claim 7, wherein one of said first and second shafts (7, 13) of said at least one rocker (6, 12) positioned in said rocker chamber (55, 69) is sealed by at least one seal (26–28).

9. A control device according to claim 7, wherein said pistons (33–36; 61–64) of said actuators (1, 2; 4, 5) extends into said rocker chamber (55, 69).

10. A control device according to claim 5, wherein said actuators (4, 5) have an auxiliary piston (79, 80) for selecting gates.

11. A control device for a transmission of a motor vehicle, said control device comprising:

a housing (25);

four actuators (1, 2; 4, 5), with which a rotary and linear movement of a gear shifting shaft (3) of the transmission are performed in order to select gates and gears of the transmission;

each one of said four actuators (1, 2; 4, 5) being mounted adjacent to one another in said housing (25);

said four actuators (1, 2; 4, 5) being mounted such that central axes thereof are positioned parallel to one another;

a first shaft (13) and a first rocker (12) fixedly connected to said first shaft (13), wherein said first rocker (12) acts on a first and second of said actuators (4, 5);

a first lever (15) fixedly connected to said first shaft (13);

a connecting piece (10) connected to the gear shifting shaft (3);

a linkage (18) pivotably connecting said first lever (15) to said connecting piece (10), wherein a third and fourth of said actuators (1, 2) for selecting the gear of the transmission are positioned at the same level adjacent to one another;

a second shaft (7) and a second rocker (6) fixedly connected to said second shaft (7), wherein said third and fourth actuators (1, 2) cooperate with said second rocker (6) for selecting a gear;

wherein said first and second shafts (7, 13) each have a rotary measuring system (123, 124) connected thereto; and wherein, in a view in a direction of said central axes, said central axes define corners of a quadrangle.

* * * * *